(12) United States Patent
Martin et al.

(10) Patent No.: US 8,914,563 B2
(45) Date of Patent: Dec. 16, 2014

(54) INTEGRATED CIRCUIT, SYSTEM, AND METHOD INCLUDING A SHARED SYNCHRONIZATION BUS

(75) Inventors: Bradley Martin, Austin, TX (US); Thomas Saroshan David, Austin, TX (US); Alan Lee Westwick, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 97 days.

(21) Appl. No.: 13/407,721

(22) Filed: Feb. 28, 2012

(65) Prior Publication Data

US 2013/0227181 A1 Aug. 29, 2013

(51) Int. Cl.
*G06F 3/00* (2006.01)
*G06F 5/00* (2006.01)

(52) U.S. Cl.
USPC .............................................. 710/58; 710/61

(58) Field of Classification Search
None
See application file for complete search history.

(56) References Cited

U.S. PATENT DOCUMENTS

| 6,490,638 B1 * | 12/2002 | Ha et al. ........................... 710/15 |
| 6,609,163 B1 * | 8/2003 | Nguyen et al. .................. 710/21 |
| 7,822,070 B2 * | 10/2010 | Van Vlimmeren et al. ... 370/503 |
| 2009/0132741 A1 * | 5/2009 | Kim et al. ..................... 710/104 |

* cited by examiner

*Primary Examiner* — Kris Rhu
(74) *Attorney, Agent, or Firm* — Cesari & Reed, LLP; R. Michael Reed

(57) ABSTRACT

An integrated circuit includes a shared synchronization bus having a plurality of channels assigned to one or more of a plurality of peripheral modules. The integrated circuit further includes a first peripheral module of the plurality of peripheral modules including a control output coupled to the shared synchronization bus and configured to communicate event timing data to an input of a second peripheral module of the plurality of peripheral modules through a selected one of the plurality of channels.

19 Claims, 3 Drawing Sheets

INTEGRATED CIRCUIT, SYSTEM, AND METHOD INCLUDING A SHARED SYNCHRONIZATION BUS

FIELD

The present disclosure is generally related to micro controller units (MCUs), and more particularly to integrated circuits having an MCU that is coupled to one or more peripherals.

BACKGROUND

Integrated circuits with micro controller units (MCUs) are used in a wide variety of electronic circuits. MCUs typically include a processor core, a memory, and one or more programmable input/output peripherals. Such peripheral modules can include data input devices, such as cameras or scanners, sensors, or other input devices. Inter-operation between MCU-based peripheral modules typically involves the use of costly and/or limited resources, including interrupt processing resources, direct memory access (DMA) services, external input/output pins or pads, and/or the provision of dedicated and predetermined control lines between peripheral modules.

SUMMARY

In an embodiment, an integrated circuit includes a shared synchronization bus having a plurality of channels assigned to one or more of a plurality of peripheral modules. The integrated circuit further includes a first peripheral module of the plurality of peripheral modules including a control output coupled to the shared synchronization bus and configured to communicate event timing data to an input of a second peripheral module of the plurality of peripheral modules through a selected one of the plurality of channels.

In another embodiment, an integrated circuit includes a synchronization bus including a plurality of channels and a plurality of peripheral modules coupled to one or more of the plurality of channels. The plurality of peripheral modules includes a first module and a second module configured to communicate through one of the plurality of channels.

In still another embodiment, a method includes receiving a signal indicating an event at a first module of a plurality of peripheral modules. The method further includes communicating event timing information from the first module to at least one second module of the plurality of peripheral modules through one or more channels of a plurality of channels of a shared synchronization bus to synchronize the second module to the event.

BRIEF DESCRIPTION OF THE DRAWINGS

In the following discussion, the same reference numbers are used to indicate the same or similar elements in the various figures.

DETAILED DESCRIPTION OF ILLUSTRATIVE EMBODIMENTS

Embodiments of an integrated circuit are described below that include a programmable counter array (PCA) coupled to a shared synchronization bus that provides inter-related timing and communication between peripherals. The PCA includes a controller configured to selectively assign one or more channels to each peripheral allowing transmission control outputs from multiple peripheral modules through the shared synchronization bus. An example of an integrated circuit including an embodiment of a PCA controller is described below with respect to FIG. 1.

Figure 1:
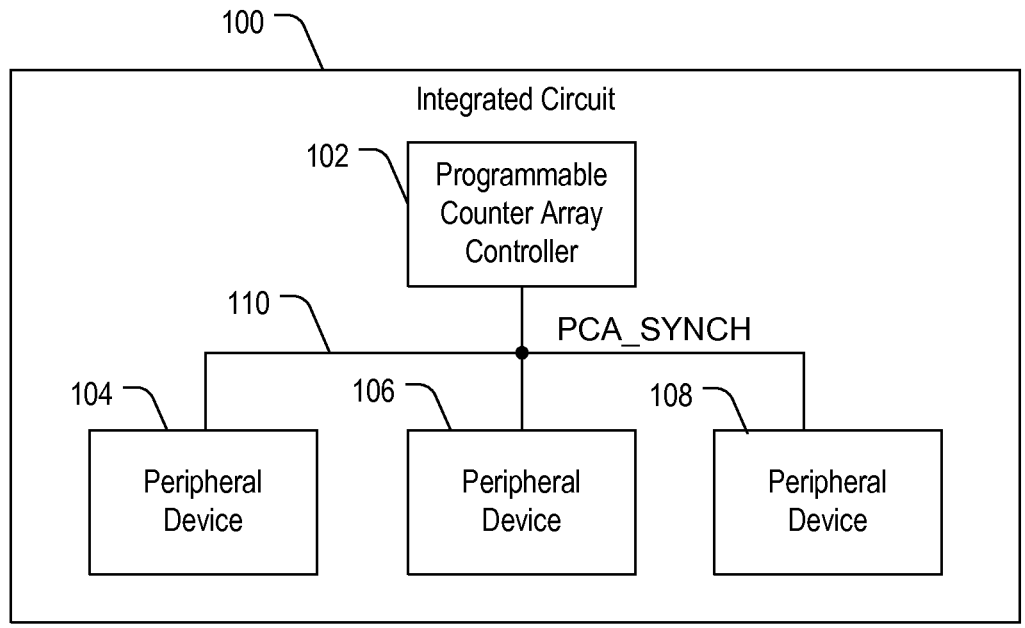
FIG. 1 is a block diagram of an integrated circuit including an embodiment of a programmable counter array (PCA) controller coupled to peripheral devices through a shared synchronization bus.

FIG. 1 is a block diagram of an integrated circuit 100 including an embodiment of a programmable counter array (PCA) controller 102 coupled to peripheral devices 104, 106, and 108 through a shared synchronization bus 110. Peripheral devices 104, 106, and 108 represent any of a number of analog and digital modules that may be coupled to or incorporated within integrated circuit 100. One example of a peripheral device includes a line scan camera module. Another example of a peripheral device includes a universal asynchronous receiver/transmitter (UART), timers, a PCA/WDT (watch dog timer), a system management bus (SMBus), and the like.

In this example, PCA controller 102 includes control logic configured to provision and assign channels to each peripheral device 104, 106, and 108. In some instances, two different peripheral devices, such as peripheral devices 104 and 106, may be assigned to a common channel to allow them to exchange information through the channel directly. The shared synchronization bus 110 allows MCU-based modules, such as the peripheral devices 104, 106, and 108 to be interconnected to create systems having interrelated timing, without consuming limited or costly resources or requiring speculative provision of a multitude of dedicated control lines on-chip. In particular, the shared synchronization bus 110 synchronizes the peripheral devices 104, 106, and 108 to one another and allows the devices to communicate through assigned channels. An example of the multiple channels within the shared synchronization bus 110 is described below with respect to FIG. 2.

Figure 2:
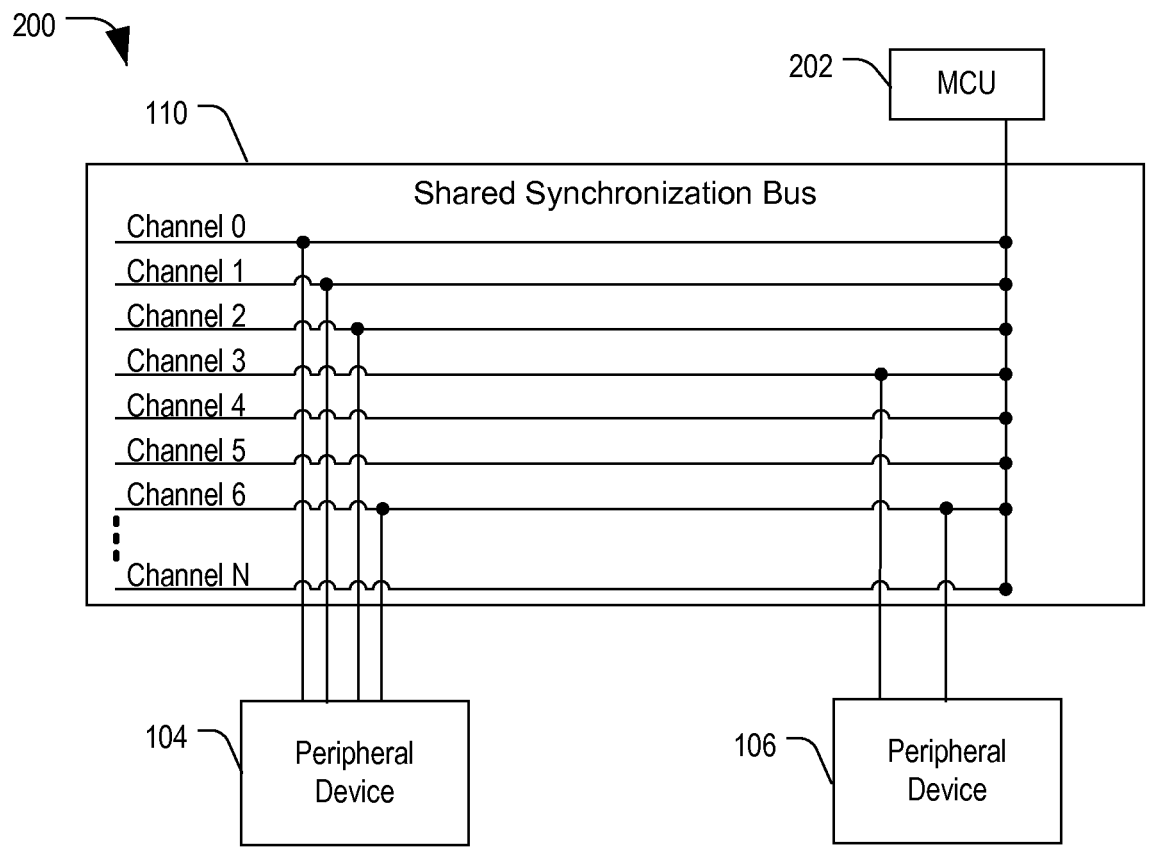
FIG. 2 is a block diagram of a portion of a system that includes an embodiment of the shared synchronization bus of FIG. 1 having multiple channels assigned to selected peripheral devices.

FIG. 2 is a block diagram of a portion of a system 200 that includes an embodiment of the shared synchronization bus 110 of FIG. 1 having multiple channels assigned to selected peripheral devices, such as peripheral devices 104 and 106. Shared synchronization bus 110 includes a number of channels, including channels [0:N] labeled "Channel 0", "Channel 1", "Channel 2", "Channel 3", . . . , and "Channel N", each of which is coupled to a micro controller unit (MCU) 202. In this example, PCA controller 102 has provisioned and assigned channels 0, 1, 2, and 6 to peripheral device 104. PCA controller 102 further has provisioned and assigned channels 3 and 6 to peripheral device 106.

In an example, data can be communicated to and from peripheral device 104 through channels 0, 1, 2, and 6. Further, data can be communicated directly between peripheral devices 104 and 106 through channel 6. In an example, peripheral device 106 can synchronize peripheral device 104 to an event, independent of clock signals. In an example, peripheral device 104 can have its own clock and/or be part of a different clock domain from peripheral device 106. However, an operation that is taking place on peripheral 106 may apply a trigger or signal to a suitable channel of synchronization bus 110 to communicate directly with peripheral device 104 to trigger an action or operation by peripheral device 104. In this way, synchronization bus 110 can be used to synchronize the peripheral devices independent of MCU 202 and independent of any system clock, but rather to an event. Thus, synchronization between peripheral devices 104 and 106 involves an event synchronization and not a "time" synchronization.

Shared synchronization bus 110 provides a shared communication bus for event synchronization, making it possible for peripheral devices to communicate data and event timing information independent of the system clock and other synchronous signals and without active bus arbitration. Instead, provisioning of the channels allows peripheral devices 104 and 106 to communicate directly.

Figure 3:
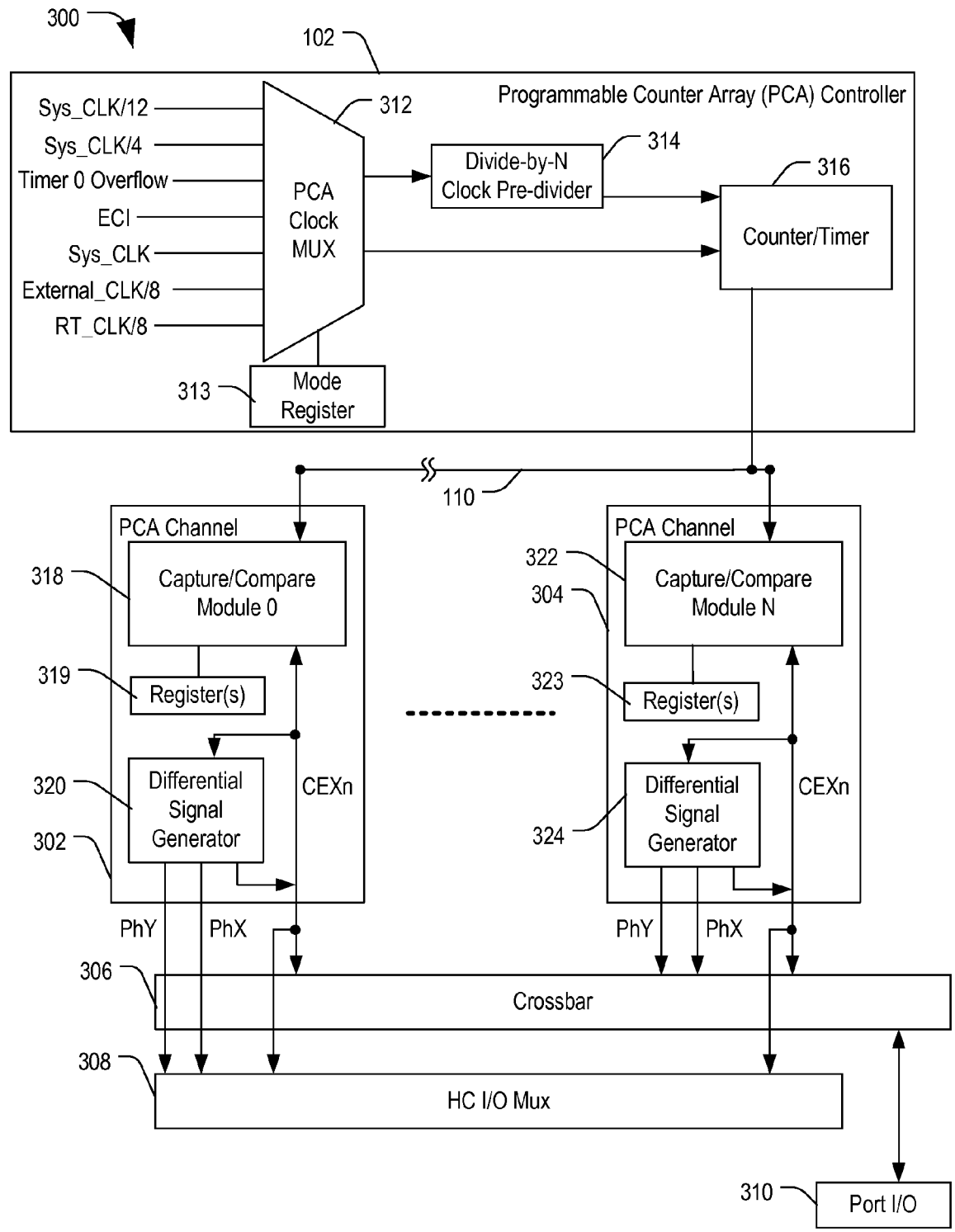
FIG. 3 is a block diagram of an embodiment of a PCA including the PCA controller of FIG. 1 and multiple PCA channels.

FIG. 3 is a block diagram of an embodiment of a PCA module 300 including the PCA controller 102 of FIG. 1 and multiple PCA channels 302 and 304. In general, the PCA module 300 is an enhanced timer system module that uses a selected clock to generate waveforms of different shapes, or, to capture timing information about input signals. A system or integrated circuit may include multiple PCAs, and each PCA includes a counter, clock control and logic circuits and several channels of comparators, which work independently to process data from the array's counter. PCA module 300 can generate several different waveforms at once, or, time several signals simultaneously, or both.

PCA module 300 includes an input clock controller (Mode Register 313) that controls selection of the clock inputs via multiplexer 312 having multiple inputs, a first output coupled to an input of a highly-configurable counter 318, and an output coupled to an input of a divide-by-n clock pre-divider 314. Clock pre-divider 314 includes an output coupled to an input of counter 316, which has an output coupled to shared synchronization bus 110. Shared synchronization bus 110 is coupled to PCA channels 302 and 304 which are coupled to a crossbar circuit 306 and a high current input/output multiplexer 308. Crossbar circuit 306 is coupled to an input/output port 310.

PCA channel 302 includes a capture/compare module 318 having an input coupled to shared synchronization bus 110 and an input/output (I/O) coupled to crossbar circuit 306 and to an input of differential signal generator 320. Differential signal generator 320 includes differential outputs (PhX and PhY) coupled to high current input/output multiplexer 308 and an output coupled to crossbar circuit 306. PCA channel 304 includes a capture/compare module 322 coupled to shared synchronization bus 110 and an input coupled to shared synchronization bus 110 and an input/output (I/O) coupled to crossbar circuit 306 and to an input of differential signal generator 324. Differential signal generator 324 includes differential outputs (PhX and PhY) coupled to high current input/output multiplexer 308 and an output coupled to crossbar circuit 306.

In general, PCA 300 includes multiple PCA channels. In one instance, PCA 300 includes up to six independent channels for processing information from counter 316 and external I/O port 310. Some implementations have multiple independent PCAs, each with different optional features.

In an example, counter 316 is driven by a programmable time base that can select between four sources: system clock (Sys_CLK, Sys_CLK/12, and Sys_CLK/4), the external oscillator source divided by 8 (External_CLK/8), Timer 0 overflows, or an external clock signal on the ECI input pin (commonly used for precision timing control). In some instances, a real time clock (RTC) divided by 8 (RT_CLK/8) can be selected. The selected input clock is fed through clock pre-divider 314 (n={1 ... 1024}) for precise definition of the counter's operating clock. In an example, counter 316 is a 16-bit up counter with a settable upper count limit, providing a continuous count from zero to the upper count limit.

Each PCA module 300 has two or more (up to six) independent PCA channels, such as PCA channels 302 and 304 for processing counter data. Each PCA channel 302 and 304 has its own I/O line (CEXn), which is routed through the crossbar circuit 306 to port I/O 308 when enabled. PCA channels 302 and 304 include programmable comparators (capture/compare modules 318 and 322) for determining the module's counter value, and logic performing a variety of operations (internal and external) based on that comparison. A data register 319 or 323 for the respective capture/compare module 318 and 322 provide reference values can also be used to "capture" the state of up-down counter/timer 316, based on a variety of conditions external to the PCA. Each PCA channel 302 and 304 may be configured to operate independently in one of four modes: a center-triggered pulse-width-modulated (PWM) mode, an edge-triggered PWM mode, a square-wave generation mode, or a timer/capture mode.

In general, PCA module 300 is configured and controlled through an Advanced Micro Controller Bus (APB) register interface (not shown). In general, PCA module 300 supports clock selection and mode selection, which can be used to update mode register 313. Further, the upper count limit is adjustable over a 16-bit range. Additionally, PCA channels 302 and 304 can operate independently in one of four modes (as described above), and the coherent load of PCA capture/compare modules 318 and 322 provides glitch-free timing adjustment while the PCA module 300 is in operation. In one instance, the pulse width of PCA signals can be adjusted to within one-half of the clock cycle period of the selected clock.

Each PCA channel 302 and 304 includes a differential output generator 320 and 324, respectively, with programmable dead time and polarity control (such as for use in controlling brushless direct current (DC) motors). PCA module 300 provides a shared synchronization bus to provide a synchronous control output to provide triggering of external events based on a variety of PCA operations. There can be a variable number of PCA channels 302 and 304 per PCA module 300, and a variable number of PCA modules per system.

In a particular implementation, a system on a chip includes three PCA modules with six channels per PCA. Each PCA channel 302 and 304 can be used to control a high-current, high-voltage output pads that may be used in motor control or other power control applications. High-current drivers include programmable, wide-range slew rate controls.

In a particular example, counter 316 includes a read/write count register, a programmable up-counter, control logic for modifying input clocks to create and control a time base, and interrupt logic controlled by a counter state. PCA clock multiplexer 312 can be controlled by bits set in a mode register 313 or by a signal from a controller. Capture/compare modules 318 and 322 are mechanisms for processing data from the up-down counter/timer 316 to either create an output waveform or to time an event. The event can be either internal (count to some value) or an external event input to PCA channel 302 or 304.

In an embodiment, each of capture/compare modules 318 and 322 includes or is coupled to a data register 319 and 323, a comparator, and logic configurable to perform a variety of operations: edge- and center-aligned PWM generation, square-wave generation or timer/capture functions. PCA channel operations are configured in each channel's APB configuration registers (not shown). The comparator reference value or capture information is held in the channel data register 319 or 323. The state of the channel (high or low) can be read or written as one or more bits within the data register 319 or 323.

In an example, the state of the bits in data registers 319 and/or 323 can be visible at the CEX port when the PCA channel 302 or 304 is configured as an output. In this instance, the OUTD register bit is readable, for example, in the data register 319 of PCA channel 302, and is captured at the rising edge of the peripheral bus clock. Short-lived changes (OUTD pulses that are a half-cycle long) that occur on the falling edge of the peripheral bus clock may not be visible when reading the OUTD register bit.

In general, the operating mode of each PCA channel 302 and 304 can be set independently, but some channel applications may use settings in the array's shared counter 316 that are not compatible with other channel modes. Because all PCA channels 302 and 304 share the same counter 316, the channels are configured to make compatible use of the counter/timer 316. For example, although it is possible to set the UL register at any upper limit value, some channel modes may be configured with a UL value of $((2^n)-1)$. When different PCA channels 302 and 304 in the same PCA module 300 are configured in different operating modes, the upper limit register can be set to a value that is compatible among all channel modes in use.

In operation, data register 319 feeds data to capture/compare module 318 to match against a counter value of counter 316. The comparison triggers an event that can be used to generate waveforms by toggling, setting or clearing an output state of PCA channel 302, for example. If counter 316 is configured for free-running count-up operation, the channel comparison performed by capture/compare module 318 (for example) can be configured for software-driven single-shot timing operations. In this example, the value stored by register 319 that is used for capture/compare module 318 to perform the comparison is configured to mark a period in advance of the array counter's present value. The resulting comparison event can then be used to trigger a system event.

Further, the output state of PCA channel 302 (for example) is transmitted on the same control line used for receiving input state, CEXn. One CEXn line is provided for each PCA channel 302 and 304. This line may be used as either an input (for timing external events) or as an output (for signal generation modes). Further, channel function may also be extended with optional differential signal generation hardware 320 and 324. PCA channels 302 and 304 with differential signal generation hardware 320 and 324 have additional output lines (PhX and PhY), which may be available depending on the system implementation.

Figure 4:
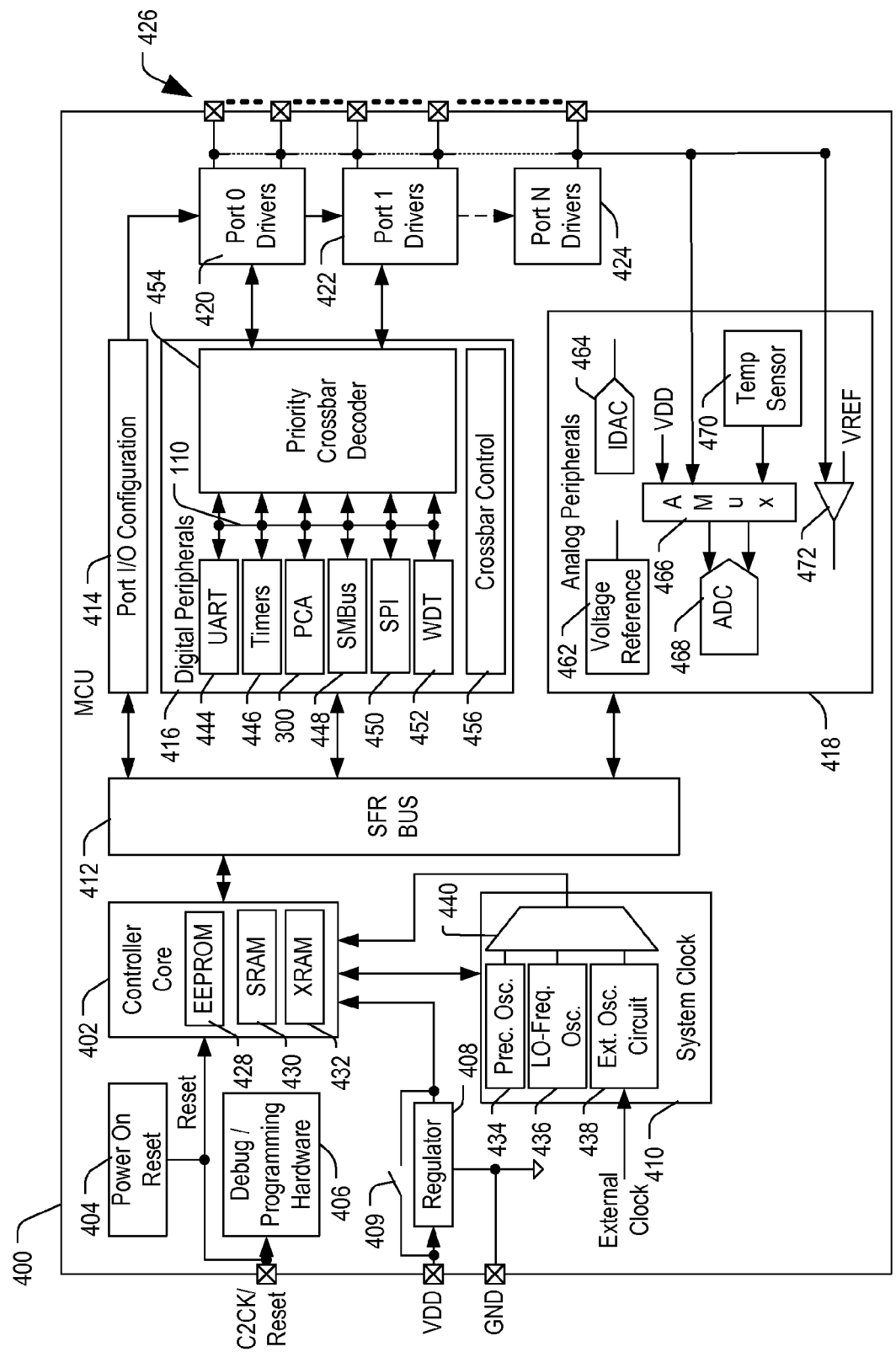
FIG. 4 is a block diagram of an embodiment of a system on a chip including the PCA controller of FIG. 3.

FIG. 4 is a block diagram of an embodiment of a system 400 including the PCA module 300 of FIG. 3. System 400 includes a controller core 402 including an input coupled to a reset pad and to a power on reset block 404. System 400 further includes debug/programming hardware 406 coupled to the reset pad. System 400 further includes a voltage regulator 408 including an input coupled to a supply pad (VDD), a second input coupled to another supply potential, such as ground (either on-chip or through a ground pad (GND)), and an output coupled to controller core 402 and to other circuitry on chip. System 400 further includes a bypass switch 409 that can be closed to bypass regulator 408. System 400 further includes a system clock 410 coupled to controller core 402. System 400 also includes a special function register (SFR) bus 412 coupled to controller core 402, to a port I/O configuration register 414, to digital peripherals 416 and analog peripherals 418. Port I/O configuration register 414 includes an output coupled to port drivers 420, 422, and 424, which are coupled to output pads 426.

Controller core 402 includes electrically-erasable programmable read-only memory (EEPROM) 428, synchronous random access memory (SRAM) 430, and RAM mapped to external data address space (XRAM) 432. System clock 410 includes a precision oscillator 434, a local oscillator 436, and an external oscillator circuit 438 coupled to an external clock. System clock 410 further includes a multiplexer 440 for selecting between input clocks (based on a signal from controller core 402) and for providing the selected clock to an input of controller core 402.

Digital peripherals 416 includes a universal asynchronous receiver/transmitter (UART) 444, timers 446, PCA 300, a system management bus (SMBus) 448, a serial peripheral interface (SPI) 450, and a watchdog timer (WDT) 452, each of which are coupled to a priority crossbar decoder 454. Digital peripherals 416 further include a crossbar control 456 and synchronous bus 110, which makes it possible for each of the peripherals to have interrelated timing.

Analog peripherals 418 include a voltage reference 462 and a current-based digital-to-analog (IDAC) 464. Analog peripherals 418 further includes an analog multiplexer 466 including an input coupled to the supply voltage pad (VDD), one or more inputs coupled to the outputs of port drivers 420, 422, and 424, an input coupled to an output of a temperature sensor 470, and outputs coupled to an input of an analog-to-digital converter 468. Analog peripherals further includes a comparator 472 having an input coupled to the outputs of port drivers 420, 422, and 424, another input for receiving a voltage reference, and an output.

In general, digital peripherals 416 and analog peripherals 418 are merely illustrative. Other digital peripheral modules (devices) and other analog peripheral modules (devices) can be included in addition to or in lieu of those shown. PCA 300 provides a shared synchronization bus 110 to synchronize timing between the various peripherals.

In an example, PCA 300 or controller 402 assigns one or more channels to each peripheral module coupled to the shared synchronization bus 110, and PCA 300 communicates with each of the peripheral modules via at least one of the assigned channels. Further, the peripheral modules may communicate directly with one another through the shared synchronization bus 110. This makes it possible for the peripheral modules to drive signals onto the shared synchronization bus 110 to synchronize other peripherals to timing of an event.

In conjunction with the integrated circuits and systems described above with respect to FIGS. 1-4, a programmable counter array is disclosed that includes multiple independent channels, each of which can be assigned to one or more of a plurality of peripheral modules. Data can be encoded into an appropriate channel of the shared synchronization bus for communication to a selected one of the peripheral modules via the selected channel. In an example, peripheral modules can communicate directly with one another through a selected one of the channels and without requiring a bus arbitration module or bus controller. In an example, the peripheral module can send a signal to a second peripheral module to synchronize the second peripheral module to timing of an event. In some instances, the peripheral modules may be part of different clock domains. In an embodiment, the integrated circuit includes a shared synchronization bus a programmable counter array (PCA) module including a plurality of PCA channels. Each of the plurality of PCA channels is assigned to a selected one of a plurality of peripheral modules and configured to communicate data between the selected one and the shared synchronization bus.

Although the present invention has been described with reference to preferred embodiments, workers skilled in the art will recognize that changes may be made in form and detail without departing from the spirit and scope of the invention.

What is claimed is:

1. An integrated circuit comprising:
a shared synchronization bus including a plurality of channels assigned to one or more of a plurality of peripheral modules; and
a first peripheral module of the plurality of peripheral modules including a control output coupled to the shared synchronization bus and configured to communicate event timing data to an input of a second peripheral module of the plurality of peripheral modules through a selected one of the plurality of channels to synchronize the first peripheral module and the second peripheral module to an event independent of a clock signal; and
a programmable counter array (PCA) having a PCA controller, the PCA controller comprises:
a multiplexer including a plurality of inputs to receive a respective plurality of periodic signals, a select input, a first output, and a second output;
a clock divider including an input coupled to the first output of the multiplexer; and
a counter including a first input coupled to an output of the clock divider, and a second input coupled to the second output of the multiplexer, and an output coupled to the shared synchronization bus.

2. The integrated circuit of claim 1, further comprising a register configured to store data representing a selectable assignment of the control output from the first peripheral module to the shared synchronization bus.

3. The integrated circuit of claim 1, wherein the PCA includes a plurality of PCA channels, each of the plurality of PCA channels comprising:
a register to store at least one reference value; and
a compare module including a first input coupled to the shared synchronization bus, a second input coupled to the register, and an output.

4. The integrated circuit of claim 3, further comprising:
a crossbar circuit coupled to the output; and
a input/output port coupled to the crossbar.

5. The integrated circuit of claim 3, wherein each of the plurality of PCA channels further comprises a differential signal generator including an input coupled to the output of the compare module, a first output coupled to a high current input/output multiplexer, and a second output coupled to a multiplexer.

6. The integrated circuit of claim 1, wherein at least one of the plurality of channels is independently programmable to operate in a selected one of a plurality of modes.

7. The integrated circuit of claim 1, wherein the PCA is configured to generate waveforms of different shapes.

8. An integrated circuit comprising:
a synchronization bus including a plurality of channels; and
a plurality of peripheral modules coupled to one or more of the plurality of channels, the plurality of peripheral modules including a first module and a second module configured to communicate through one of the plurality of channels to synchronize the second module to an event at the first module; and
wherein each channel of the plurality of channels comprises:
a register to store at least one reference value; and
a compare module including a first input coupled to the shared synchronization bus, a second input coupled to the register, and an output.

9. The integrated circuit of claim 8, wherein:
the first module has a first clock and the second module has a second clock; and
the first module sends a signal through the one of the plurality of channels to the second module to synchronize the first module and the second module to the event independent of clocks signals of the first clock and the second clock.

10. The integrated circuit of claim 8, further comprising a register configured to store data representing a selectable assignment of control outputs from the plurality of peripheral modules to the shared synchronization bus.

11. The integrated circuit of claim 8, wherein the second module communicates event timing information to the first module through the one of the plurality of channels to synchronize the first module to an event.

12. The integrated circuit of claim 8, further comprising:
a crossbar coupled to the output; and
a input/output port coupled to the crossbar.

13. The integrated circuit of claim 8, further comprising a programmable counter array (PCA) module coupled to the synchronization bus, wherein the PCA module includes a PCA controller, the PCA controller comprising:
a multiplexer including a plurality of inputs to receive a respective plurality of periodic signals, a select input, a first output, and a second output;
a clock divider including an input coupled to the first output of the multiplexer and including a divider output; and
a counter including a first input coupled to the divider output, a second input coupled to the second output of the multiplexer, and an output coupled to the shared synchronization bus.

14. The integrated circuit of claim 8, wherein each of the plurality of channels is independently programmable to operate in a selected one of a plurality of modes.

15. A method comprising:
receiving a signal indicating an event at a first module of a plurality of peripheral modules;
communicating event timing information corresponding to the event from the first module to at least one second module of the plurality of peripheral modules through one or more channels of a plurality of channels of a shared synchronization bus to synchronize the at least one second module to the event independent of a clock signal, each channel of the plurality of channels comprises:
a register to store at least one reference value; and
a compare module including a first input coupled to the shared synchronization bus, a second input coupled to the register, and an output.

16. The method of claim 15, further comprising triggering an operation at the second module in response to the event timing information.

17. The method of claim 16, wherein:
the first and second modules are responsive to first and second clock signals, respectively; and
the operation at the second module is synchronized to the event timing at the first module using the event timing information.

18. The method of claim 15, wherein communicating the event timing comprises:
determining a selected assignment of control outputs from the plurality of peripheral modules to the shared synchronization bus from values stored in a register; and communicating the event timing to the second module based on the selected assignment.

19. The method of claim 15, further comprising:

receiving a plurality of periodic signals at a plurality of inputs of a multiplexer, the multiplexer including a select input, a first output, and a second output;

receiving an output signal from the first output of the multiplexer at an input of a clock divider having a divider output; and receiving a first signal from the divider output at a first input of a counter;

receiving a second signal from the second output of the multiplexer at a second input of the counter; and providing an output to the shared synchronization bus in response to at least one of the first signal and the second signal.

\* \* \* \* \*